(12) United States Patent
Jeong et al.

(10) Patent No.: US 6,809,153 B2
(45) Date of Patent: Oct. 26, 2004

(54) THERMOPLASTIC RESIN COMPOSITION

(75) Inventors: Kie-Youn Jeong, Kyoungki-Do (KR);
Tae-Seung Lee, Kyoungki-Do (KR);
Min Nam, Taejeon (KR)

(73) Assignee: Hyundai Motor Company, Seoul (KR)

( * ) Notice: Subject to any disclaimer, the term of this patent is extended or adjusted under 35 U.S.C. 154(b) by 104 days.

(21) Appl. No.: 10/066,492

(22) Filed: Jan. 30, 2002

(65) Prior Publication Data

US 2002/0151653 A1 Oct. 17, 2002

(30) Foreign Application Priority Data

Jan. 31, 2001 (KR) .......................................... 2001-4480

(51) Int. Cl.$^7$ .......................... C08L 23/00; C08L 23/04; C08L 27/12; C08L 45/00
(52) U.S. Cl. .................. 525/191; 525/199; 525/216; 525/232; 525/240; 525/241; 524/502; 524/505; 524/515; 524/520
(58) Field of Search ................................. 525/191, 199, 525/216, 232, 240, 241; 524/502, 505, 515, 520

(56) References Cited

U.S. PATENT DOCUMENTS

| 4,212,787 A | | 7/1980 | Matsuda et al. | |
| 4,311,628 A | | 1/1982 | Abdou-Sabet et al. | |
| 6,344,525 B1 | * | 2/2002 | Lee et al. | 525/384 |
| 6,498,213 B2 | * | 12/2002 | Jeong et al. | 525/191 |

FOREIGN PATENT DOCUMENTS

| JP | 48-26835 | 4/1973 |

* cited by examiner

Primary Examiner—Nathan M. Nutter
(74) Attorney, Agent, or Firm—Pennie & Edmonds LLP

(57) ABSTRACT

The present invention relates to a thermoplastic resin composition capable for being used for skin materials of automotive interior parts comprising a base composition comprising a polypropylene resin, an olefin copolymer rubber, a processing oil, and a low-density polyethylene resin or a high-density polyethylene resin; an organic peroxide crosslinking agent; a crosslingking aid; and polytetrafluoroethylene resin.

20 Claims, No Drawings

THERMOPLASTIC RESIN COMPOSITION

FIELD OF THE INVENTION

The present invention relates to a thermoplastic resin composition capable for being used for skin materials of automotive interior parts due to excellent extrusion and calender moldability. More particularly, it relates to an olefin-based thermoplastic resin composition comprising a base composition comprising a polypropylene resin, an olefin copolymer rubber, a processing oil, and a low-density polyethylene resin or a high-density polyethylene resin; organic peroxide crosslinking agent; a crosslingking aid; and polytetrafluoroethylene resin.

BACKGROUND OF THE INVENTION

Polyvinylchlorides (PVCs) or PVC/acrylonitrile-butadiene-styrene graft copolymer(ABS) alloy extruded sheets or calendered sheets have been widely used for skin materials of automotive interior parts such as instrument panel, door trim panel, headlining, and the like. Recently olefin-containing thermoplastic polyolefin (TPO) sheets have replaced PVCs which have a few drawbacks such as the difficulty in recycling and lightening, generation of environmentally unfriendly compounds, fogging phenomenon, and offensive odor. However, since a processing oil is added to assist the molding process of olefin copolymer rubbers such as ethylene-propylene-diene monomer (EPDM), the olefin-containing thermoplastic elastomer resins have poor calender moldability and a low melt strength which cause deterioration in the second moldability such as vacuum thermoforming, thus being inappropriate to use as automotive parts requiring deep drawing. When an amount of the processing oil used is reduced and a degree of crosslingking of EPDM is increased to improve the calender moldability, the molded articles have a very rough surface. On the other hand, if the degree of crosslinking of EPDM is lowered, the obtained resin composition sticks to the surface of rolls at the time of molding process.

To solve such problems, U.S. Pat. No. 4,212,787 discloses that pre-crosslinked EPDM rubber is diluted into a polypropylene resin having good fluidity. However, practically sufficient elasticity and mechanical properties cannot be obtained to use for complicated articles such as instrument panel and door trim panel because the level of crosslink density is low. Further, it requires special facilities for crosslinking process and dilution process and the manufacturing cost is also increased. JP Unexamined Publication No. 48-26835 discloses that a polypropylene resin and EPDM rubber are pre-mixed and melt-kneaded and then it is heat-treated with peroxide. However, practically sufficient degree of crosslinking and viscosity to use for calender molding cannot be obtained due to hyper-degradation of the polypropylene resin and local crosslinking of EPDM rubber. U.S. Pat. No. 4,311,628 discloses a method of homogeneous crosslinking of EPDM rubber using a phenol-base crosslinking agent. The resin prepared by this method exhibits better elasticity and mechanical properties due to favorable degree of crosslinking and homogeneous particles compared to the resin prepared by using peroxide-base crosslinking agent but there are drawbacks in that there are problems associated with prolonged crosslinking time, use of an expensive crosslinking agent raises the cost of final products, and the resin has poor solubility, resulting in decrease of coatability. Further, U.S. Pat. No. 4,212,787 discloses a peroxide-non-curable-hydrocarbon rubbery material such as polyisobutylene (PIB) and butyl rubber (BR) is used when EPDM/polypropylene composition is cured and kneaded with peroxide to improve the fluidity without degrading properties of the thermoplastic elastomer composition. However, even if the thermoplastic elastomer composition exhibits homogeneous crosslink density of EPDM, the crosslink density of the final products are not sufficient for calender molding. Therefore, the composition is poor in mechanical strength, moldability, permanent compression set and heat resistance.

SUMMARY OF THE INVENTION

In order to solve the above problems, we developed a novel olefin-base thermoplastic resin composition that maintains the crosslink density of an olefin copolymer rubber. This is accomplished in part by adding an organic peroxide crosslinking agent, a crosslinking aid, low density or high density polyethylene resin, and polytetrafluoroethylene (PTFE) in an appropriate amount during the crosslinking process of a blend of a polypropylene resin, an olefin copolymer rubber and a processing oil.

Accordingly, an object of the present invention is to provide a thermoplastic resin composition capable of the second molding for automotive parts having high deep drawing such as instrument panel as well as calender and extrusion molding.

DETAILED DESCRIPTION OF THE INVENTION

The present invention provides a thermoplastic resin composition capable for being used for skin materials of automotive interior parts comprising:

(A) a base composition comprising (1) 5% to 45% by weight, for example 15% to 30% by weight, of a polypropylene; (2) 5% to 80% by weight, for example 40% to 60% by weight, of an olefin-base copolymer rubber; (3) 5% to 30% by weight, for example 10% to 20% by weight, of a processing oil; (4) 1% to 30% by weight, for example 5% to 20% by weight, of one chosen from low density polyethylene resin, high density polyethylene resin and a mixture thereof;

(B) 0.02–5 parts by weight, for example 1% to 3% by weight, of an organic peroxide crosslinking agent on the basis of 100 parts by weight of the base composition (A);

(C) 0.1–5 parts by weight, for example 1% to 3% by weight, of a crosslinking aid on the basis of 100 parts by weight of the base composition (A); and (D) 0.5–5 parts by weight, for example 1% to 3% by weight, of a polytetrafluoroethylene on the basis of 100 parts by weight of the base composition (A).

The components of the thermoplastic resin composition of the present invention will be discussed in detail.

(A) Base Composition (1) Polypropylene Resin

A polypropylene resin to be used in the present invention is an attactic polymer prepared as a block copolymer or random copolymer of propylene and α-olefin monomer. The polypropylene resin is a crystalline polymer having a melt index (230° C., 2160 g) of from 0.1 to 60 g/10 min, preferably 5 to 20 g/10 min. If the fluidity is higher the range, the thermoplastic composition is inferior in calender molding due to lowered viscosity. Examples of α-olefin monomer include ethylene, propylene, 1-butene, 1-pentene, and 1-hexene.

Another polypropylene resin to be used in the present invention is a polymer prepared by extrusion and having a melt index (230° C., 2160 g) of 130–160 g/10 min, preferably 140–150 g/10 min.

The polypropylene resin of the present invention is used within the range of from 5 to 45% by weight. If the content is less than 5% by weight, the hardness and heat stability are lowered and emboss may not be formed during vacuum thermoforming. On the other hand, if the content exceeds 45% by weight, the sheets are easily bended and it is difficult to restoration due to too high hardness.

(2) Olefin-Based Copolymer Rubber

An olefin-based copolymer rubber to be used in the present invention is amorphous and a random copolymer copolymerized with at least two monoolefins. A preferred representative of the olefin-base copolymer rubber is an ethylene-propylene-diene terpolymer copolymerized with ethylene and propylene as main components, that is, for example, where ethylene and propylene comprise at least 80% by weight of the copolymer rubber. It is also preferred to use dicyclopentadiene, 1,4-hexadiene, methylene norbornene, ethylidene norbornene, cyclohexadiene or its derivatives to allow unsaturated function in the terpolymer. Among terpolymers, an ethylene-propylene-ethylidene-norbornane is a preferred embodiment.

Besides the above olefin-base copolymer rubbers, other olefin-base copolymer rubbers may be used in the present invention and examples thereof include ethylene-propylene copolymers (EPM), ethylene-octene copolymers (EOM), ethylene-butene copolymers, and styrene-ethylene-butylene-styrene copolymers (SEBS). Among these, ethylene-propylene copolymers, ethylene-octene copolymers, and ethylene-butene copolymers are particularly preferred. A melt index (230° C., 2160 g) of the ethylene-propylene copolymers is 1 g/10 min or less and melt indexes (230° C., 2160 g) of ethylene-octene copolymers and ethylene-butene copolymers are 5 g/10 min or higher. A mixture of olefin-base copolymer rubbers may be used.

The olefin-base copolymer rubber of the present invention is used within the range of from 5 to 80% by weight. If the content is less than 5% by weight, the hardness is too high and thus sheet molding is not applicable. On the other hand, if the content exceeds 80% by weight, the hardness is lowered and thus the heat stability is inferior.

(3) Processing Oil

A processing oil to be used in the present invention is preferred to be a paraffin-type mineral oil having an ignition temperature of from 300 to 580° C. Conventional paraffin wax has excellent moldability but it has a problem in storage stability. However, the preferred processing oil when used in the present invention has been proved to improve both moldability and storage stability of the thermoplastic resin composition.

The processing oil of the present invention is used within the range of from 5 to 30% by weight. If the content is less than 5% by weight, the cost may increase and processability is inferior. On the other hand, if the content exceeds 30% by weight, the storage stability is inferior at a high temperature, resulting in leakage on the surface of the sheet.

(4) Polyethylene Resin

A polyethylene resin to be used in the present invention may be a low density polyethylene resin, a high density polyethylene resin or a mixture thereof.

The low density polyethylene resin used in the present invention is a copolymer of ethylene and α-olefin monomer and has a melt index (190° C., 2160 g) of 10 g/10 min or less, preferably 1 g/10 min or less. If the fluidity increases the above range, the appearance of molded articles is excellent but the resins have poor calender moldability and a low melt strength to deteriorate the second moldability such as vacuum thermoforming, thus being inappropriate to use as automotive parts requiring deep drawing such as instrument panel. Examples of the α-olefin monomer include 1-butene, 1-pentene, and 1-hexene.

The high density polyethylene resin used in the present invention is a copolymer of ethylene and α-olefin monomer and has a melt index (190° C., 2160 g) of 5 g/10 min or less, preferably 1 g/10 min or less. If the fluidity increases the above range, the appearance of molded articles is excellent but the emboss surviving ratio is decreased. Examples of the monomer include 1-butene, 1-pentene, and 1-hexene.

The polyethylene resin of the present invention is used within the range of from 1 to 30% by weight on the basis of the base composition (A). If the content is less than 1% by weight, it is not practical for the product requiring high deep drawing. On the other hand, if the content exceeds 30% by weight, the heat stability is deteriorated.

(B) Organic Peroxide Crosslinking Agent

A crosslinking agent to be used in the present invention is organic peroxides, and specific examples include benzoyl peroxide, lauryl peroxide, dicumyl peroxide, 1,3-bis(t-butylperoxyisopropyl)benzene, di(t-butyl) peroxide, 2,5-dimethyl-2,5-di(t-butylperoxy)hexane, 2,5-dimethyl-2,5-di(t-butylperoxy)hexane-3, n-chlorobenzoyl peroxide, n-butyl-4,4-bis(t-butylperoxy) ballirate, 2,4-dichlorobenzoyl peroxide, or mixtures thereof. Among these, 1,3-bis(t-butylperoxyisopropyl)benzene is more preferred in the view of odor and scorch stability. An amount of the crosslinking agent may be adjusted depends on the degree of crosslinking and flowability of the resin and is preferably used within the range of from 0.01 to 5 parts by weight on the basis of 100 parts by weight of the base composition (A) comprising the components (1)-(4). During the curing process with the organic peroxide, it is preferred to use after impregnation in a random polypropylene for homogeneous dispersion and better molding process which can otherwise be problems with a small amount of peroxides used.

(C) Crosslinking Aid

A crosslinking aid of the present invention is used to prevent hyper-degradation of the polypropylene resin and stabilize radicals produced. An amount of the crosslinking aid is used within the range of from 0.01 to 5 parts by weight on the basis of 100 parts by weight of the base composition (A). Examples of the crosslinking aid include divinylbenzene, ethylene glycol dimethacrylate, triallyl cyanurate, diethylene glycol dimethacrylate, allyl methacrylate, trimethylolpropane trimethacrylate. Among these, triallyl cyanurate is more preferred.

(D) Polytetrafluoroethylene Resin

Besides the above components of the present invention, a fluorocarbon, particularly polytetrafluoroethylene resin may be used to improve the melt strength. It is used within the range of from 0.5 to 5 parts by weight on the basis of 100 parts by weight of the base composition (A). Polytetrafluoroethylene resin is well known as a tradename of "Teflon" such as 800J of Dupont Corp.

The components of the present composition may be compounded and coextruded through Bambury kneader, twin screw extruder, or buss kneader. However, since continuous processing may influence the quality of the final products, continuous extruding devices are preferred to batch devices. The components of the present composition can be melt-kneaded by the use of single-, twin-screw extruder or buss kneader at 130–280° C., preferably 190–250° C., to obtain a sheeted item having desired properties and homogeneity. Again, it may be desirable to premix the crosslinking agent, the crosslinking aid, or both in separate portions of the polyolefin to improve mixing characteristics of these minor components.

The following examples are intended to further illustrate the present invention without limiting its scope. Testing methods employed in measuring properties in the Examples and Comparative Examples are as follows.

(1) Procedure for preparing Specimen: Sheeting was performed by a roll mill (roll size, 8 inches in diameter; and working temperature of 200° C.) and specimen was prepared to meet standard requirement.

(2) Property Tests (1) Tensile strength and tensile elongation: Tested according to JIS K 6301 with a rate of 500 mm/min (2) Roll mill moldability: Sheeting was performed by a roll mill at 200° C. and adhesion of the sheet was determined.

(3) Embossing survival ratio: A sheet having emboss surface was formed by vacuum thermoforming and the conditions of its surface were observed.

(4) Vacuum moldability: The sheet having an embossed surface was formed by vacuum thermoforming and the crack, torn condition, and thickness changes in appearance were observed.

Further, each of components and abbreviation thereof used in Examples and Comparative Examples are as follows.

(1) PP-1: Polypropylene resin having an ethylene content of 8% and a melt index (230° C., 2160 g) of 4 g/10 min.

(2) PP-2: Polypropylene resin having an ethylene content of 8% and a melt index (230° C., 2160 g) of 180 g/10 min.

(3) PP-3: Ethylene-propylene copolymer rubber, which is atactic polymer, having a melt index (230° C., 2160 g) of 1.0 g/10 min.

(4) EPM: Ethylene-propylene copolymer rubber having an ethylene content of 72% and a melt index (230° C., 2160 g) of 0.7 g/10 min.

(5) EPDM-1: Ethylene-propylene-diene monomer copolymer rubber having a specific gravity of 0.86, an ethylene norbornene (ENB) content of 5%, and a Mooney viscosity ($ML_{1+4}$ (125 □) of 60 dL/g.

(6) EPDM-2: Ethylene-propylene-diene monomer copolymer rubber having a specific gravity of 0.86, an ethylene norbornene (ENB) content of 4.7%, and a Mooney viscosity ($ML_{1+4}$ (125 □) of 26 dL/g.

(7) Processing oil: WO-1900 of Michang Oil. Co., Ltd.

(8) EOR: Ethylene-octene copolymer rubber having a specific gravity of 0.86 and a melt index (190° C., 2160 g) of 5 g/10 min.

(9) LDPE: Low density polyethylene resin having a melt index of (190° C., 2160 g) of 0.8 g/10 min.

(10) HDPE: High density polyethylene resin having a melt index of (190° C., 2160 g) of 0.7 g/10 min.

(11) PTEF: Polytetrafluoroethylene (800 J of Dupont, Teflon™

(12) Paraffin wax: LG-102N of Lion Chemicals.

(13) Organic peroxide: 1,3-bis(t-buryl)peroxideisopropyl benzene (Perkadox 14-40 of Akzo chemicals)

(14) Crosslinking aid: Triallyisocyanurate (Perkalink 301-40 of Akzo Chemicals)

PREPARATION EXAMPLE

Preparation of Polypropylene/olefin Copolymer Rubber

Preparation of TPE-1

EPDM-1 of 60% by weight, PP-1 of 20% by weight, and a processing oil of 20% by weight were charged, and melt-kneaded at pre-heated Bambury mixer for 10 min and then pelletized.

Preparation of TPE-2

EPDM-2 of 60% by weight, PP-1 of 20% by weight, and a processing oil of 2% by weight were charged, and melt-kneaded at pre-heated Bambury mixer for 10 min and then pelletized.

Preparation of TPE-3

EPDM-1 of 60% by weight, PP-2 of 20% by weight, and a processing oil of 20% by weight were charged, and melt-kneaded at pre-heated Bambury mixer for 10 min and then pelletized.

Each content of components used for preparing olefin-base copolymer rubber pellets is described in Table 1.

TABLE 1

| | Content (% by weight) | | |
|---|---|---|---|
| Component | TPE-1 | TPE-2 | TPE-3 |
| EPDM-1 | 60 | | 60 |
| EPDM-2 | | 60 | |
| PP-1 | 20 | 20 | |
| PP-2 | | | 20 |
| Processing oil | 20 | 20 | 20 |

Examples 1–4

TPE-1, TPE-2, TPE-3, PP-1, EPM, LDPE, HDPE, organic peroxide (Perkadox 14-40), and a crosslinking aid (Perkalink 301-40) were blended in the ratios shown in Table 2. The mixture was kneaded at 200–240° C. by using twin-screw extruder to prepare a pellet. After that, sheeting was performed by a roll mill (roll size, 8 inches in diameter; and working temperature of 200° C.) to prepare specimen. Physical properties of the obtained resin composition were tested and the result is shown in Table 2.

When ethylene-propylene-diene copolymer rubber having high viscosity and ethylene-propylene-diene copolymer rubber having low viscosity were mixed in an appropriate ratio and then the mixture was mixed further with polytetrafluoroethylene resin as shown in Table 2, both sheet molding and vacuum molding were the most excellent.

Comparative Examples 1–3

Based on the compositions of Examples 1–3, an excess amount of low density polyethylene was used in Comparative Example 1, an excess amount of PP-1 was used in Comparative Example 2, and an ethylene α-olefin (EOR) was replaced instead of an ethylene-propylene copolymer rubber (EPM) of Example 3 and polytetrafluoroethane (PTFE) was not used in Comparative Example 3. Except the contents, the specimen of Comparative Examples 1–3 were prepared according to the Examples 1–3.

From the results in Table 2, the thermoplastic resin composition of the present invention is excellent in hardness, tensile strength, roll adhesion, embo survival ratio and vacuum moldability. Especially, the thermoplastic resin composition of the present invention is excellent in the extrusion and calender moldabilities, thus suitable for skin materials of automotive interior parts.

TABLE 2

| Category | | Example | | | | Comparative Example | | |
|---|---|---|---|---|---|---|---|---|
| | | 1 | 2 | 3 | 4 | 1 | 2 | 3 |
| Base composition (g) | TPE-1 | 30 | 30 | 30 | | 30 | 60 | 30 |
| | TPE-2 | 20 | 15 | 20 | 20 | 20 | | 20 |
| | TPE-3 | | | | 30 | | | |
| | PP-1 | 20 | 20 | 20 | | 10 | 35 | 20 |
| | PP-2 | | | | 10 | | | |
| | PP-3 | | | | 10 | | | |
| | EPM | 15 | 10 | 15 | 15 | | | |
| | EOR | | | | | | | 15 |
| | LDPE | 10 | 15 | 10 | 15 | 35 | 5 | 10 |
| | HDPE | 5 | 10 | 5 | | 5 | | 5 |
| Additive (g) | Org. peroxide | 2 | 2 | 3 | 2 | 2 | 2 | 2 |
| | Cross-linking aid | 1.5 | 1.5 | 1.5 | 1.5 | 1.5 | 1.5 | 1.5 |
| | PTFE | 3 | 3 | 3 | 3 | | | |
| | Paraffin wax | 3 | | | | | | |
| Physical property | Hardness | 93A | 96A | 96A | 93A | 88A | 97A | 94A |
| | Tensile strength | 105 | 107 | 110 | 100 | 94 | 115 | 100 |
| | Roll adhesion | ⊚ | ○ | ○ | □ | ○ | ○ | □ |
| | Emboss survival ratio | ⊚ | ○ | ○ | ○ | X | □ | □ |
| | Vacuum moldability | ⊚ | ⊚ | □ | ○ | □ | X | ○ |

⊚ = Excellent
○ = Good
□ = Bad
X = Worst

What is claimed is:

1. A plastic resin composition comprising
    (A) a base composition comprising (1) 5–45% by weight of a polypropylene; (2) 5–80% by weight of an olefin-based copolymer rubber; (3) 5–30% by weight of a processing oil; (4) 1–30% by weight of a low density polyethylene resin, high density polyethylene resin or a mixture thereof;
    (B) 0.02–5 parts by weight of an organic peroxide crosslinking agent on the basis of 100 parts by weight of the base composition (A);
    (C) 0.1–5 parts by weight of a crosslinking aid on the basis of 100 parts by weight of (A) the base composition (A); and
    (D) 0.5–5 parts by weight of a polytetrafluoroethylene on the basis of 100 parts by weight of (A) the base composition (A).

2. The thermoplastic resin composition according to claim 1, wherein (1) said polypropylene is an attactic polymer prepared as a block copolymer or random copolymer of propylene and a-olefin monomer and a crystalline polymer having a melt index (230° C., 2160 g) of 0.1–60 g/10 min.

3. The thermoplastic resin composition according to claim 1, wherein (1) said polypropylene is a polymer prepared by extrusion and having a melt index (230° C., 2160 g) of 130–160 g/10 min.

4. The thermoplastic resin composition according to claim 1, wherein (2) said olefin-base copolymer rubber is selected from the group consisting of ethylene-propylene-diene terpolymer, ethylene-propylene copolymer rubber, ethylene-butene copolymer rubber, ethylene-octene copolymer rubber, and styrene-ethylene-butylene-styrene copolymers (SEBS).

5. The thermoplastic resin composition according to claim 1, wherein (3) said processing oil is a paraffinic mineral oil having an ignition temperature of from 300° to 580° C.

6. The thermoplastic resin composition according to claim 1, wherein (4) said low density polyethylene resin is a copolymer of ethylene and a-olefin monomer and has a melt index (190° C., 2160 g) of 10 g/10 min or less.

7. The thermoplastic resin composition according to claim 1, wherein (d) said high density polyethylene resin is a copolymer of ethylene and a-olefin monomer and has a melt index (190° C., 2160 g) of 5 g/10 min or less.

8. The thermoplastic resin composition according to claim 6, wherein said a-olefin monomer is selected from the group consisting of 1-butene, 1-pentene, and 1-hexene.

9. The thermoplastic resin composition according to claim 7, wherein said a-olefin monomer is selected from the group consisting of 1-butene, 1-pentene, and 1-hexene.

10. The thermoplastic resin composition according to claim 1, wherein (B) organic peroxide crosslinking agent is selected from the group consisting of benzoyl peroxide, lauryl peroxide, dicumyl peroxide, 1,3-bis(t-butylperoxyisopropyl)benzene, di(t-butyl) peroxide, 2,5-dimethyl-2,5-di(t-butylperoxy)hexane, 2,5-dimethyl-2,5-di(t-butylperoxy)hexane-3, n-chlorobenzoyl peroxide, n-butyl-4,4-bis(t-butylperoxy) ballirate, 2,4-dichlorobenzoyl peroxide.

11. The thermoplastic resin composition according to claim 1, wherein (C) said crosslinking aid is selected from the group consisting of divinylbenzene, ethylene glycol dimethacrylate, triallyl cyanurate, diethylene glycol dimethacrylate, allyl methacrylate, and trimethylolpropane trimethacrylate.

12. A thermoplastic resin composition comprising,
    (B) a base composition comprising (1) 15% to 30% by weight of a polypropylene, (2) 40 to 60% by weight of an olefin-based copolymer rubber; (3) 10% to 20% by weight of a processing oil; and (4) 5% to 20% by weight of a low density polyethylene resin, high density polyethylene resin or a mixture thereof;
    (E) 1 part to 5 parts by weight of an organic peroxide crosslinking agent on the basis of 100 parts by weight of the base composition (A);
    (F) 0.1–5 parts by weight of a crosslinking aid on the basis of 100 parts by weight of(A) the base composition (A); and
    (G) 0.5–5 parts by weight of a fluoridated polyolefin resin on the basis of 100 parts by weight of (A) the base composition (A).

13. The thermoplastic resin composition according to claim 12, wherein the polypropylene is a crystalline attactic polymer prepared as a block copolymer or random copolymer of propylene and a-olefin monomer and having a melt index (230° C., 2160 g) of 0.1–60 g/10 min; the olefin-base copolymer rubber is selected from the group consisting of ethylene-propylene-diene terpolymer, ethylene-propylene copolymer rubber, ethylene-butene copolymer rubber, ethylene-octene copolymer rubber, and styrene-ethylene-butylene-styrene copolymers; and the low density polyethylene resin is a copolymer of ethylene and a-olefin monomer and has a melt index (190° C., 2160 g) of 10 g/10 min or less.

14. The thermoplastic resin composition according to claim 12, wherein the polypropylene comprises a polymer prepared by extrusion and having a melt index (230° C., 2160 g) of 130–160 g/10 min.

15. The thermoplastic resin composition according to claim 12, wherein (2) said olefin-base copolymer rubber is selected from the group consisting of ethylene-propylenediene terpolymer, ethylene-propylene copolymer rubber, ethylene-butene copolymer rubber, ethylene-octene copolymer rubber, and styrene-ethylene-butylene-styrene copolymers (SEBS).

16. The thermoplastic resin composition according to claim 12, wherein the polypropylene is a crystalline attactic polymer prepared as a block copolymer or random copolymer of propylene and a-olefin monomer and having a melt index (230° C., 2160 g) of 0.1–60 g/10 min; and the olefin-base copolymer rubber comprises dicyclopentadiene, 1.4-hexadiene, methylene norbornene, ethylidene norbornene, cyclohexadiene, or derivatives thereof in an amount sufficient to provide unsaturated function to the rubber.

17. The thermoplastic resin composition according to claim 12, wherein the processing oil is a paraffinic mineral oil having an ignition temperature of from 300° to 580° C., and the fluoridated polyolefin resin is a fluoridated polyethylene resin.

18. The thermoplastic resin composition according to claim 12, wherein the low density polyethylene resin is a copolymer of ethylene and a-olefin monomer and has a melt index (190° C., 2160 g) of 10 g/10 min or less, the high density polyethylene resin is a copolymer of ethylene and a-olefin monomer and has a melt index (190° C., 2160 g) of 5 g/10 min or less, or both, and the a-olefin monomer is independently selected from the group consisting of 1-butene, 1-pentene, and 1-hexene.

19. The thermoplastic resin composition according to claim 1, wherein (B) organic peroxide crosslinking agent is selected from the group consisting of benzoyl peroxide, lauryl peroxide, dicumyl peroxide, 1,3-bis(t-butylperoxyisopropyl)benzene, di(t-butyl) peroxide, 2,5-dimethyl-2,5-di( t-butylperoxy)hexane, 2,5-dimethyl-2,5-di(t-butylperoxy)hexane-3, n-chlorobenzoyl peroxide, n-butyl-4,4-bis(t-butylperoxy) ballirate, 2,4-dichlorobenzoyl peroxide.

20. The thermoplastic resin composition according to claim 12, wherein the crosslinking aid is selected from the group consisting of divinylbenzene, ethylene glycol dimethacrylate, triallyl cyanurate, diethylene glycol dimethacrylate, allyl methacrylate, and trimethylolpropane trimethacrylate.

* * * * *